No. 633,055. Patented Sept. 12, 1899.
C. TROUP.
RAILWAY SWITCH.
(Application filed Jan. 27, 1899.)

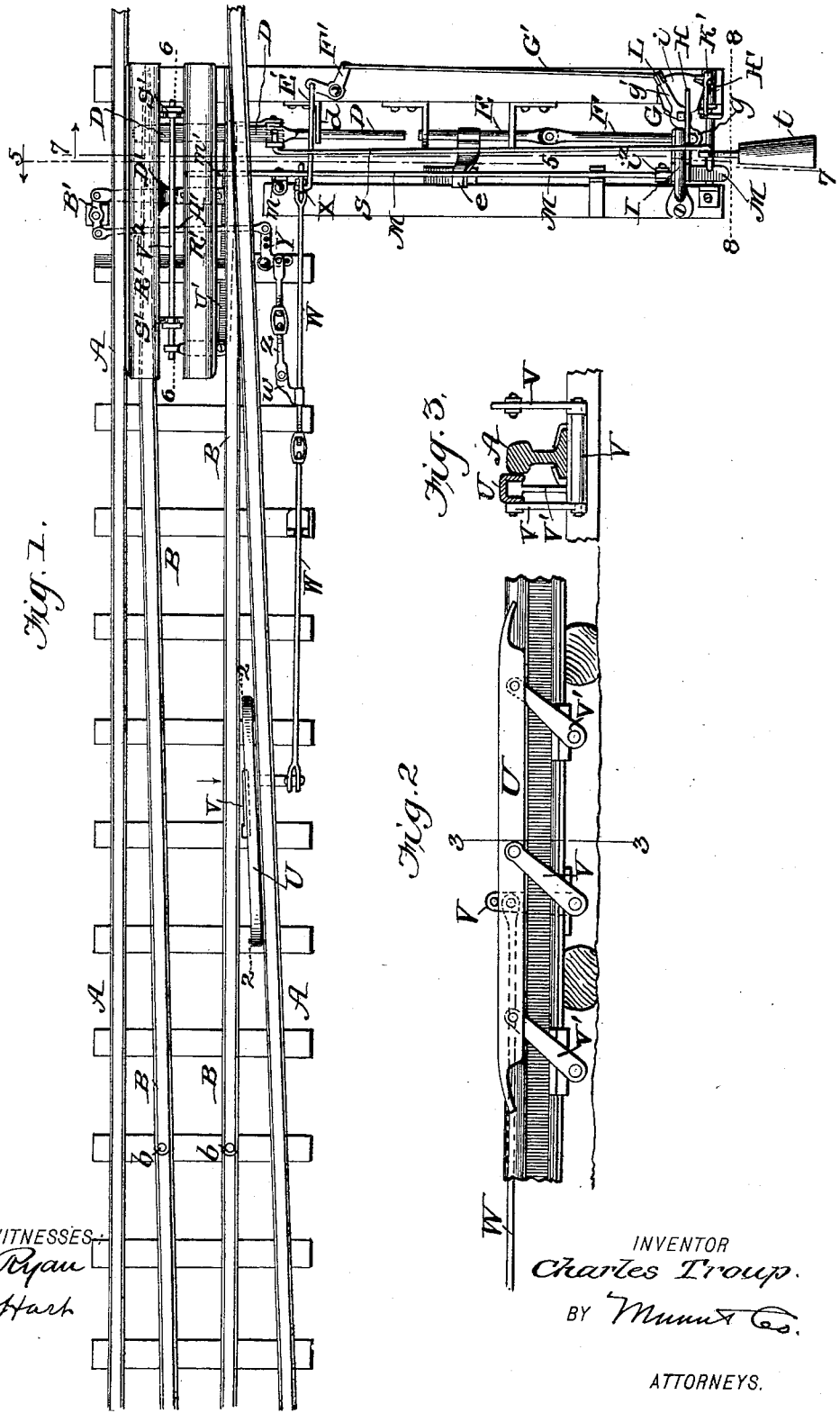

(No Model.) 3 Sheets—Sheet 2.

WITNESSES: Jos. A. Ryan, Amos W. Hash

INVENTOR Charles Troup
BY Munn & Co.
ATTORNEYS.

THE NORRIS PETERS CO., PHOTO-LITHO., WASHINGTON, D. C.

No. 633,055. Patented Sept. 12, 1899.
C. TROUP.
RAILWAY SWITCH.
(Application filed Jan. 27, 1899.)
(No Model.) 3 Sheets—Sheet 3.
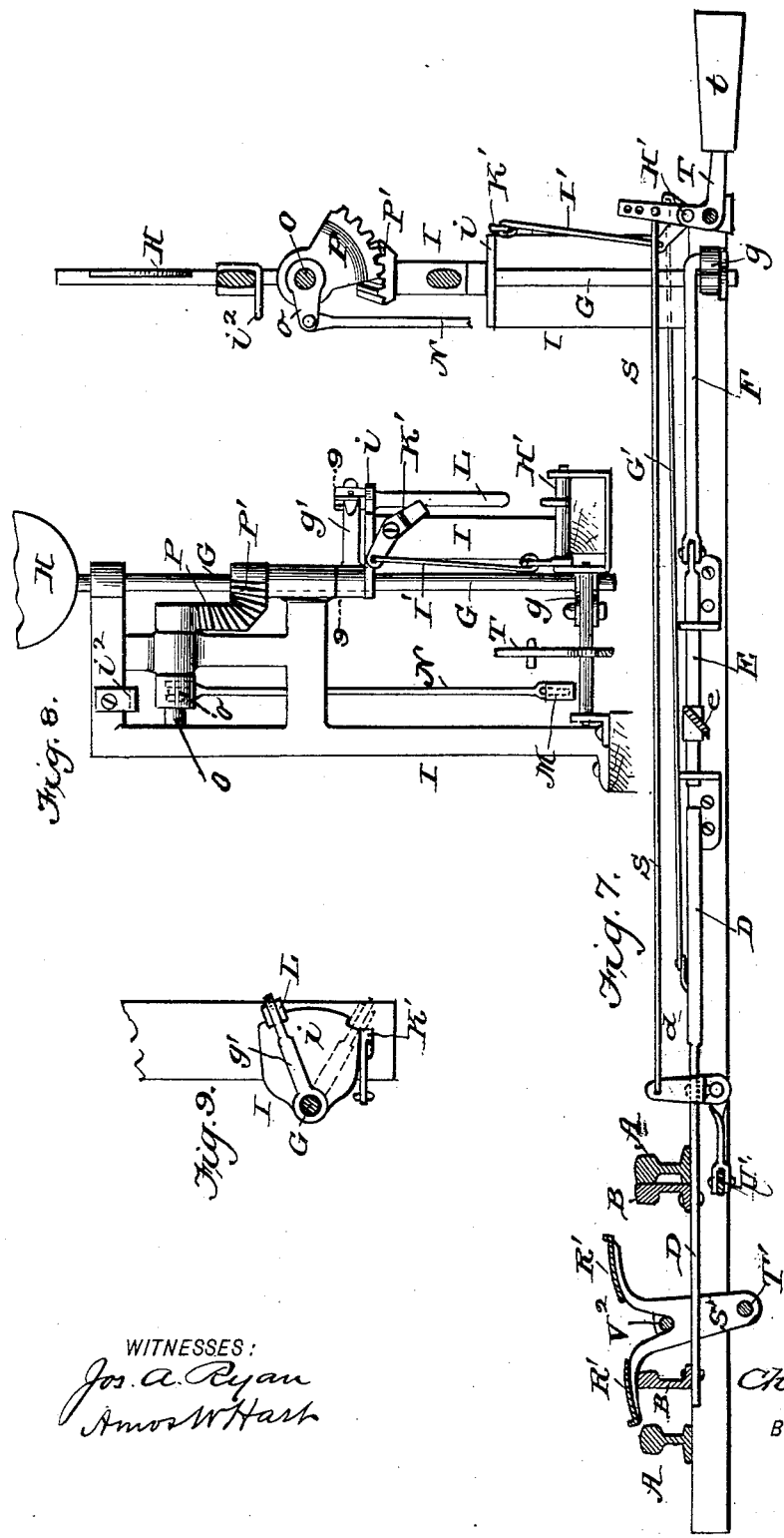
WITNESSES:
Jos. A. Ryan
Amos W Hart
INVENTOR
Charles Troup.
BY Munn & Co.
ATTORNEYS.

UNITED STATES PATENT OFFICE.

CHARLES TROUP, OF WATSEKA, ILLINOIS.

RAILWAY-SWITCH.

SPECIFICATION forming part of Letters Patent No. 633,055, dated September 12, 1899.

Application filed January 27, 1899. Serial No. 703,640. (No model.)

*To all whom it may concern:*

Be it known that I, CHARLES TROUP, residing at Watseka, in the county of Iroquois and State of Illinois, have made certain new and useful Improvements in Railroad-Switches, of which the following is a specification.

My present invention is an improvement upon one for which I have received Letters Patent No. 586,918, dated July 20, 1897, and which covers certain devices for operating pivoted switch-rails, for locking the same in position to open the main line, and for releasing the said locking devices automatically.

My invention comprises certain features of construction, arrangement, and combination of parts, as hereinafter described and claimed.

Figure 4:
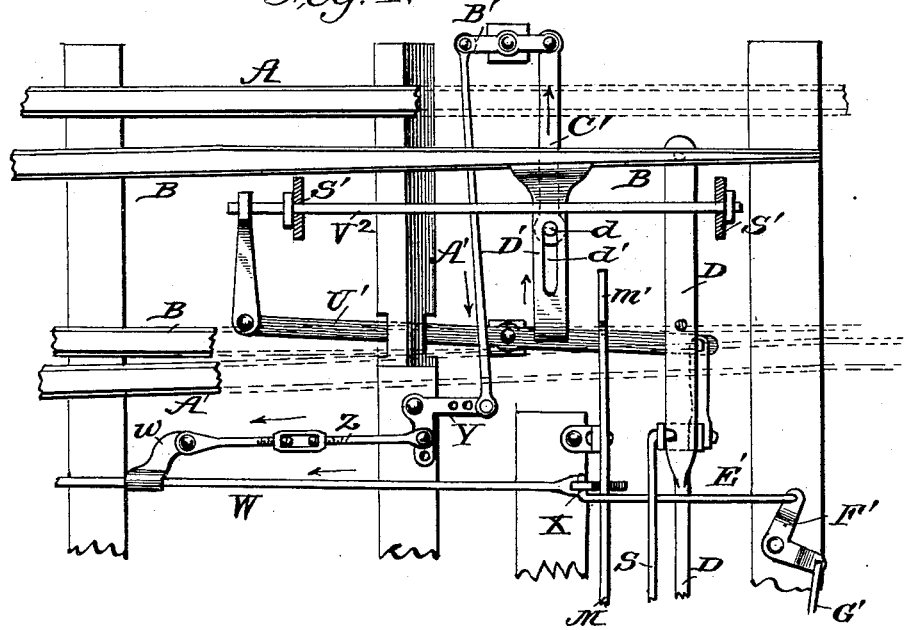
Figure 5:
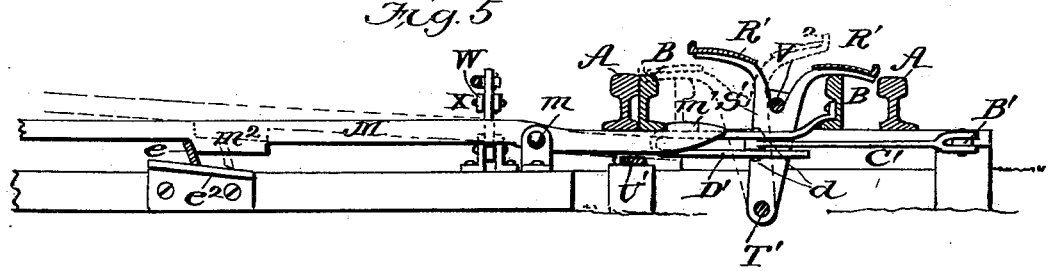
Figure 6:
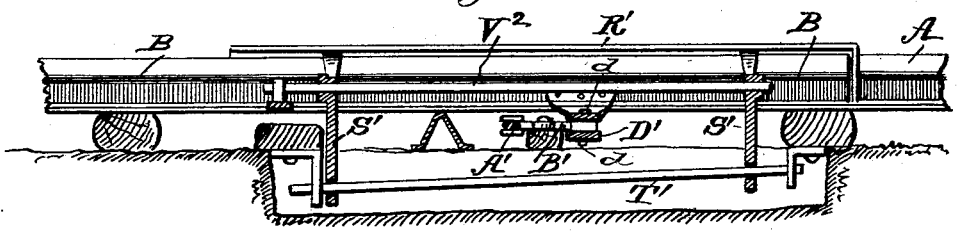

In the accompanying drawings, (three sheets,) Figure 1 is a plan view of a section of a railway-switch provided with my improvements. Fig. 2 is an enlarged longitudinal section on line 2 2 of Fig. 1. Fig. 3 is a vertical transverse section on the line 3 3 of Fig. 2. Fig. 4 is an enlarged plan view of a portion of the switch, portions of the rails being removed. Fig. 5 is a vertical section on the line 5 5 of Fig. 1. Fig. 6 is a vertical section on the line 6 6 of Fig. 1. Fig. 7 is a section on the line 7 7 of Fig. 1. Fig. 8 is a transverse section on the line 8 of Fig. 1. Fig. 9 is a cross-section horizontally on the line 9 9 of Fig. 8.

Referring in the first instance particularly to Fig. 1, the letter A indicates the main or fixed rails, and B the pivoted or switch rails. The latter are scarfed or tapered at their free ends to adapt them to fit closely with the fixed rails A of the main line and are pivoted at $b$, as shown. The points of the said switch-rails B are rigidly connected by the bar D, which extends under them and is suitably bolted thereto. The said bar D slides in a guide $d$ and is arranged in alinement with the push-rod E, which is jointed to and operated by a pitman F. The latter is pivotally connected with an arm $g$ of the vertical rock-shaft G, (see Fig. 7,) to which the target H, Fig. 8, is attached. The said shaft G is suitably supported in bearings attached to a switch-stand I. This switch-stand has a notched top plate $i$, and a pivoted drop-latch L, attached to arm $g'$, engages the notches and serves to lock the rock-shaft G, and thereby the switch-rails B. This latch L also serves as a hand-lever for throwing the switch-rails B when required. It will be understood that the shaft G is turned one-quarter around whenever the switch-rails B are shifted to open or close the siding and that the face of the target H is then at right angles to the track and visible up and down the line when the switch is open.

The switch-rails B are locked in position to open the main line, as shown in Fig. 1, by means of a lever M, which is arranged at right angles to the track and pivoted at $m$. Its inner end $m'$, Fig. 5, is notched to adapt it to engage the adjacent switch-rail B. The outer end of this locking-lever is weighted and connected by a rod N, Fig. 1, and with the arm $o$ of a rock-shaft O, mounted horizontally in the switch-stand frame I and having a mutilated bevel-gear P, that meshes with a similar gear P' on the target-shaft G. Thus when such locking-lever M is tilted on its pivot $m$ to release the switch-rails B the shaft O is necessarily rocked, and thereby the target-shaft G is rotated a quarter-turn correspondingly. For the purpose of properly limiting the rotation of the target H, I provide the stand I with a lateral arm $i^4$, Fig. 8, that serves as a stop for arresting the upward movement of the rod N, connected with lock-lever M.

As shown in Figs. 1 and 7, I provide the following means for holding the switch normally closed—namely, a rod S and the weighted and pivoted elbow-lever T. The said rod S connects the bar D and the vertical arm of said lever T, whose horizontal arm carries the weight $t$. Thus the weight $t$ normally holds the switch-rails in position. (Shown in Fig. 7.)

In Fig. 1 I show the push-rod E provided with an arm $e$ for raising or tripping the lock-lever M to disengage its catch from the adjacent switch-rail B, as shown by dotted lines in Fig. 5. The lever M has a cam or beveled projection $m^2$, Fig. 5, with which said arm engages and slides under said projection. The said arm $e$ rides horizontally on a fixed plate $e^2$. Thus whenever the slide-rod D is acted on by the alined push-rod E and pitman F to open the switch the lock-lever M is at the same time tripped to release said rails.

The tripping device U, acted on by wheels of trains passing over the siding for throwing the switch-rails B automatically, is substantially the same as employed in my former invention. It consists of a short bar or rail-section (see Figs. 1 and 2) mounted on rock-arms V' and a rock-lever V, to which is attached a rod W, that extends alongside the track A and operates a bell-crank lever X, that projects under the lock-lever M at a point between its pivot and weighted end. Thus when the bar U is depressed by the flanges of car-wheels passing over the siding B the lever X is rocked, and thereby caused to raise the weighted end of the lock-lever M, so as to disengage its catch $m'$ from the switch-rail. (See dotted lines, Fig. 5.) At the same time this is done the rails B are acted on by the mechanism hereinafter described and shifted as required to open the switch, so that trains may pass onto or off the siding. The said mechanism is composed of the parts shown in Fig. 1 and enlarged in Fig. 4.

A bell-crank lever Y is pivoted horizontally adjacent to the inner fixed rail A and connected by a rod Z with an arm $w$, attached to the long rod W. Turnbuckles are applied to rods W and Z and serve to shorten or lengthen them, as may be required. The bell-crank lever Y is further connected with a horizontal straight lever B' on the other side of the track by means of a rod A', that extends beneath the latter. Another rod C' is also pivoted to the straight lever B' and has a slidable connection with a flat slotted bar D', that is attached to the switch-rail B adjacent to the lever B'. The said bar D' is doubled on itself, as shown in Fig. 5, forming what I term a "gooseneck," and the free end of rod C' slides between the parallel portions of the said gooseneck and has a vertical pin $d$, that rides in the upper and lower slots $d'$ of the same. It will be seen that when the rod W is drawn in the direction of the arrow (shown in Fig. 4) the shorter, Z, will have the same movement and the rods A' and C' be moved in opposite directions, the latter in that case drawing the switch-rails B over. Thus the slots $d'$ in the gooseneck D have no effect when the switch is to be shifted, but permit the switch to be thrown by hand, since it then allows the pin to slide in the slots, so that the bar C', lever B', rod A', and lever Y-remain stationary. The slots also allow for the lost motion required that the lock may be released before the rails B are thrown for the siding.

I also provide means for unlocking or releasing the hand-lever latch L from the outer notch of plate $i$—that is to say, I connect the rod W, Fig. 1, by means of a short rod E' with a bell-lever F', and the latter is in turn connected by a rod G' with a rock-shaft H', (see Fig. 8,) which is arranged at the base of the switch-stand I. From said rock-shaft H' a rod I' extends vertically to a lever K', pivoted just below the plate $i$ of the switch-stand I. The free end of said lever K' acts against the latch L to throw it out of the notch, so that the target rock-shaft G is left free to rotate, as required, to allow bar D to shift to close the switch, which is effected by the action of weight $t$ on lever T, since the latter, in turn, retracts the bar D, attached to the switch-rails. Thus the switch is closed and locked automatically and the main line left clear. This construction is desirable not only when cars are intentionally directed from the siding onto the main line, but also when cars in switching either in a yard or elsewhere are accidentally thrown farther than desired. In that case if a car should be forced through a switch it would tend to injure the switch-stand or operating devices unless some means for releasing the locking devices automatically were provided. It will be noted that the instant the lock is released from the rail switch-point the target is shown and remains exposed until the lock is again in engagement with the switch-point, and this takes place whether the switch is operated by hand or automatically. If the switch be opened by hand and the train directed onto the siding, as soon as the flange of the front track-wheel of a car or locomotive bears down the tripping device U the mechanism extending beneath the rails, and of which the gooseneck forms a part, acts to hold the switch-rails rigid to siding and allows the train to work in and out of switch as long as a car-wheel is on the trip. At the same time the locking-latch L of the switch-stand remains released until train has made its egress and ingress and leaves the siding. Then the switch closes and locks automatically, and the main line is again clear.

It is highly important to prevent snow, ice, stones, bolts, or the like from resting upon the ties between the fixed rails A and points of the movable or switch rails B. For this purpose I have devised the following means for covering and protecting the rails:

As shown in Figs. 1, 5, 6, and 7, two oblong metal plates R' are secured to the lateral arms of rocking or shiftable brackets S', that are pivotally supported upon a rod or shaft T', arranged longitudinally at a point below and between the rails. Each covering-plate has a flange along its outer edge. The brackets S' and plates R', thus connected, are thrown over right or left whenever the switch-points B are shifted and always in the opposite direction to the latter, so that they will always cover space between the switch and stationary rails. The chief means to effect this is the lever U', Fig. 4, which is pivoted centrally beneath the inner rail B and adapted to swing horizontally. It is connected at one end with the slide-bar D and at the other with a rod $V^2$, that extends through and rigidly connects the brackets S'. The latter connection is at the end of the rod $V^2$ which is farthest from slide-bar D. Thus whenever bar D is moved the lever U' is shifted and the covering-plates R' thrown over, as will be readily understood, so that the coverings take their position by operation of the switch-rails B and prevent intrusion of foreign substances between the fixed and switch rails. This covering can be attached to and operated with the devices now commonly used without the use of any other part of this invention.

Having thus described my invention, what I claim, and desire to secure by Letters Patent, is—

1. The combination, in a railway-switch, with the movable switch-points, of the pivoted locking-bar adapted to engage a switch-point at its inner end, a rotary target arranged contiguous to the outer end of such locking-bar, a rock-shaft and beveled gearing for rotating the target-shaft, and means for connecting the locking-lever with said rock-shaft, substantially as shown and described.

2. The combination, with the switch-points of the locking bar or lever pivoted between its ends and detachably engaging the switch-points as described, of a target rock-shaft arranged in vertical bearings contiguous to the outer end of the locking-lever, a horizontal rock-shaft mounted in the switch-stand, and beveled gearing connecting the two rock-shafts, a rigid arm projecting from the horizontal rock-shaft, a stop arranged above said arm on the switch-stand, and a rod connecting the same arm with the aforesaid locking-lever, substantially as shown and described.

3. The combination with the switch-points, a slide-bar which rigidly connects them, a push-bar and pitman for acting on said sliding bar, a vertical rock-shaft carrying a target, and having a lateral arm to which the pitman is jointed, a locking-lever pivoted between its ends and detachably engaging the switch-points, a cam attached to the push-rod and adapted to engage a projection on the locking-lever, for tilting the same, a horizontal rock-shaft geared with the target-shaft, and a rod connecting such rock-shaft with the aforesaid locking-lever at a point adjacent to its weighted end, substantially as shown and described.

4. The combination with the fixed rails and shifting or switch rails of a tripping device located between them, a crank arm or lever connected with said device, a long pull-rod attached to said lever, a vertical rock-shaft carrying a target, and means for connecting it with the switch-rails, a weighted lever and rod for holding the switch-rails normally closed, a pivoted latch and lever attached to an arm of the target-shaft, a notch-plate on the switch-stand with which said latch engages, a pivoted lever adapted to act on the aforesaid latch for disengaging it from said plate, to allow the target-shaft to rotate, and a rock-shaft, connecting-rod, and lever, for connecting with the aforesaid long rod, substantially as shown and described.

5. The combination, with the switch-points and fixed rails, of automatic mechanism substantially as described, for shifting the said switch-rails, a tripping device located alongside the rails, a crank-shaft connected with such device, and a rod extending to and connected with the aforesaid mechanism, for operating substantially as shown and described.

6. The combination, with the fixed and switch rails, of a tripping device adapted to be acted on by car-wheels, a rod extending alongside the track, and automatic mechanism connected therewith for shifting the switch-rails, the same consisting of a rock-lever and straight lever, a rod connecting the two, and another rod connecting the straight lever with the switch-rails, whereby, when a locomotive or car passes over the siding, traction is applied to the long rod and thereby to the mechanism above specified, whereby the switch-rails are thrown from their normal position into position for the siding, substantially as shown and described.

7. The combination with the shifting rails and means for shifting them by hand, of a slotted bar attached to one of said rails, a rod having a slidable connection with said slotted bar, and supplemental levers and rods connected with a tripping device, the latter being arranged alongside the track, substantially as shown and described.

8. The combination, with fixed rails, switch-rails having points as specified, of plates adapted to shift laterally for the purpose of covering the space between one of the switch-rails and an adjacent fixed rail, substantially as shown and described.

9. The combination with a fixed rail and movable or switch rail of a covering-plate mounted on a movable support arranged exterior to said rails and adapted to pass over one of the rails, so as to cover the open space between them, and means connected with said plate for shifting it simultaneously with the switch-rail, substantially as shown and described.

10. The combination with the fixed rails and movable or switch rails of plates arranged longitudinally parallel thereto and adapted to be shifted laterally over the switch-rails, and means which shift both switch-rails and plates simultaneously, but in opposite directions, laterally, substantially as shown and described.

11. The combination with the fixed and switch rails of plates arranged parallel thereto and adapted to cover one or the other of the switch-rails, and the spaces between the latter and fixed rails, brackets supporting the said plates and pivoted at their lower ends, and lever mechanism connected with said brackets, and devices for shifting the switch-rails which are also connected with the said lever mechanism substantially as shown and described.

CHARLES TROUP.

Witnesses:
E. C. VANDERPOORTEN,
FRED W. TOREY.